Patented Aug. 25, 1931

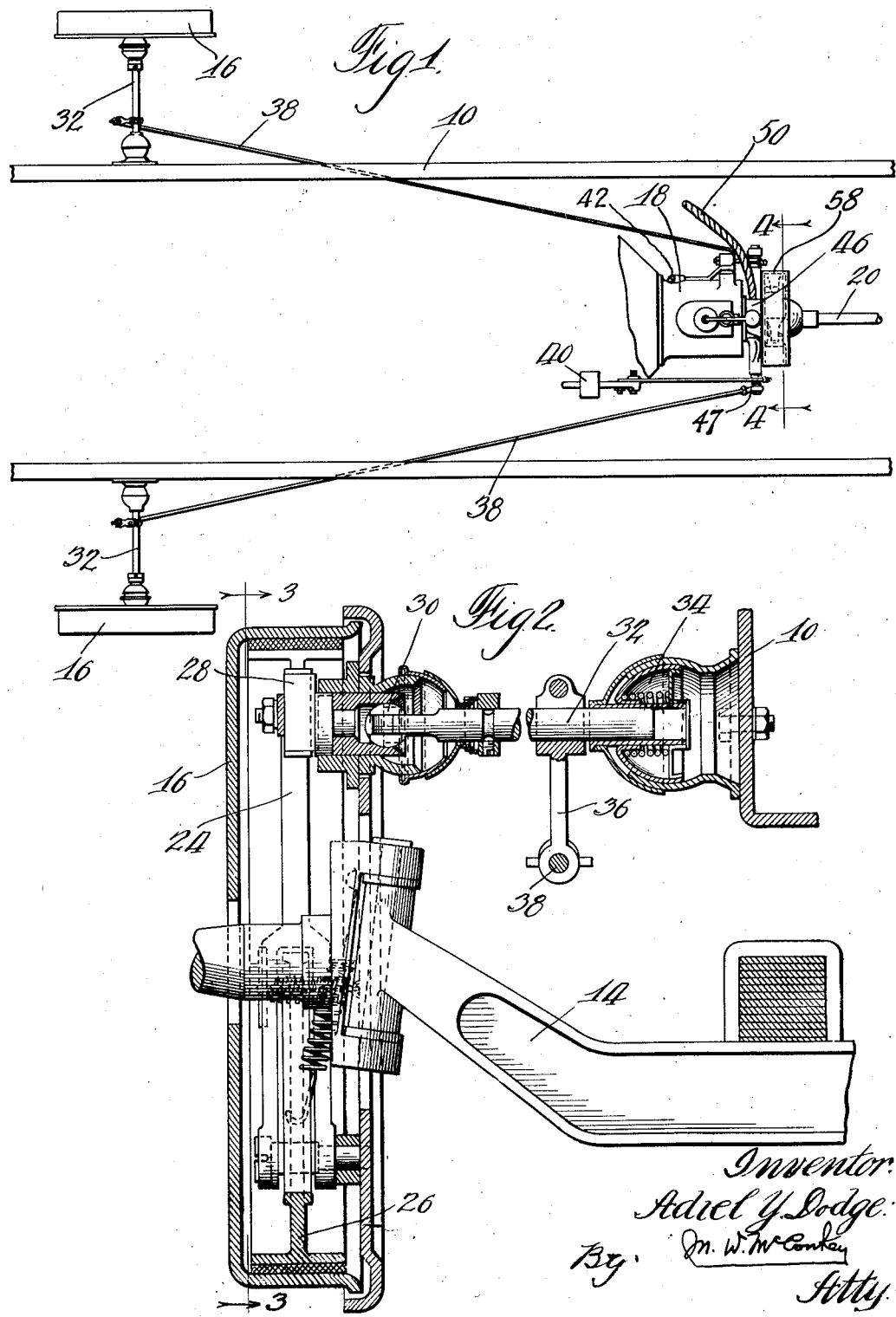

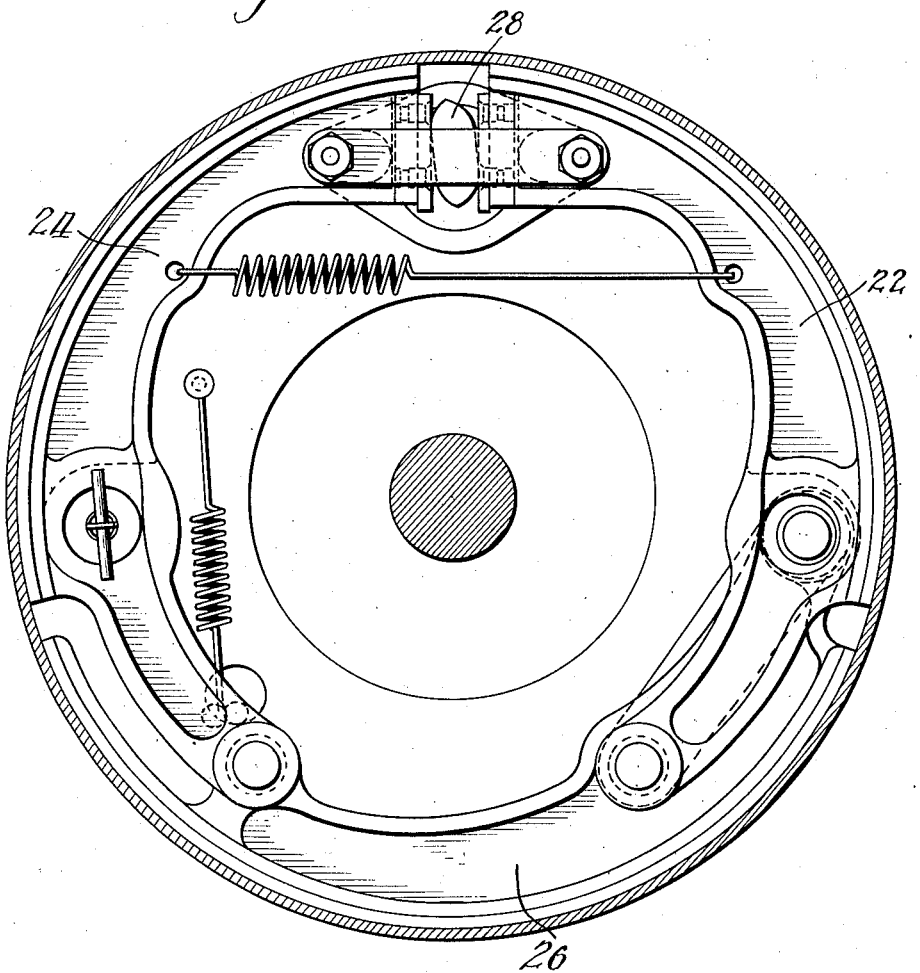

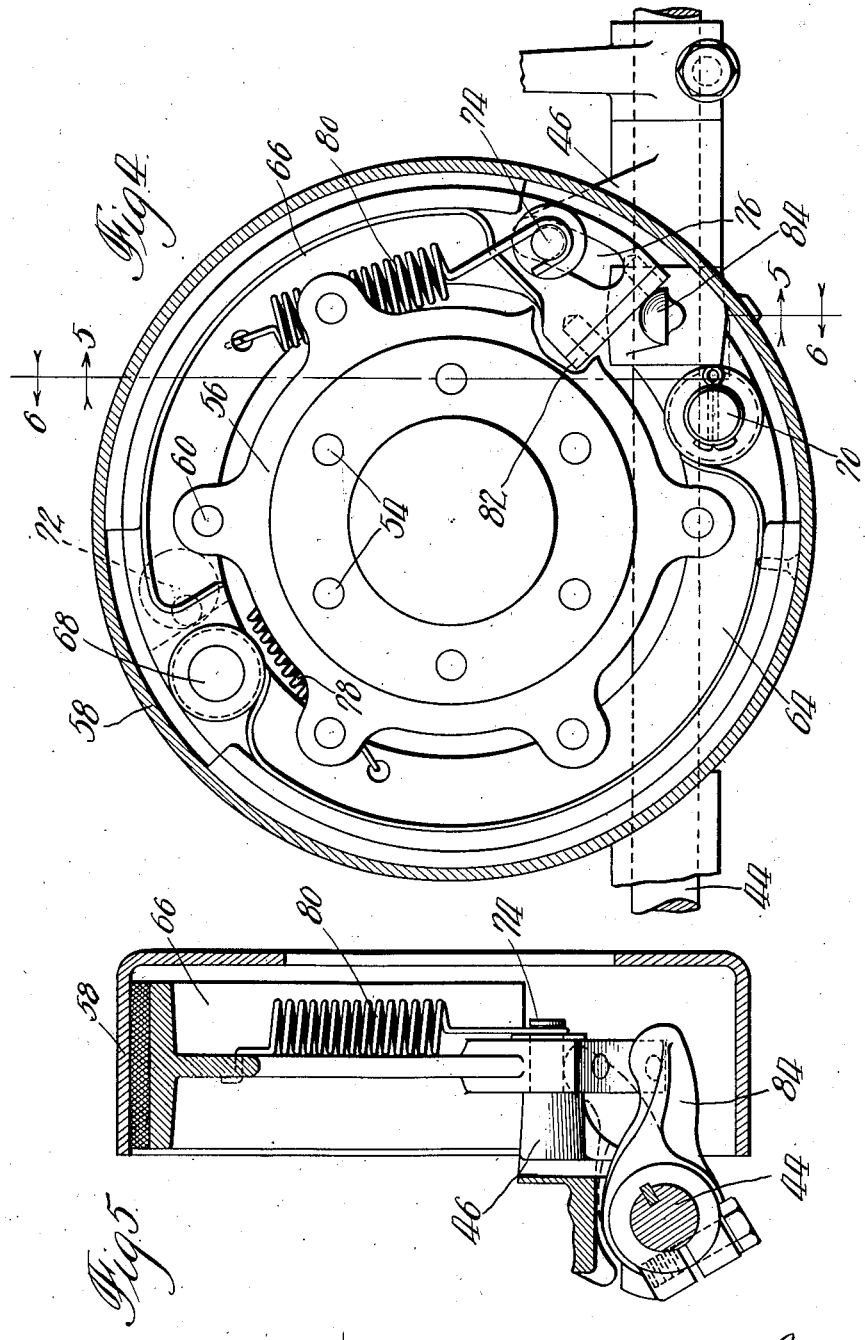

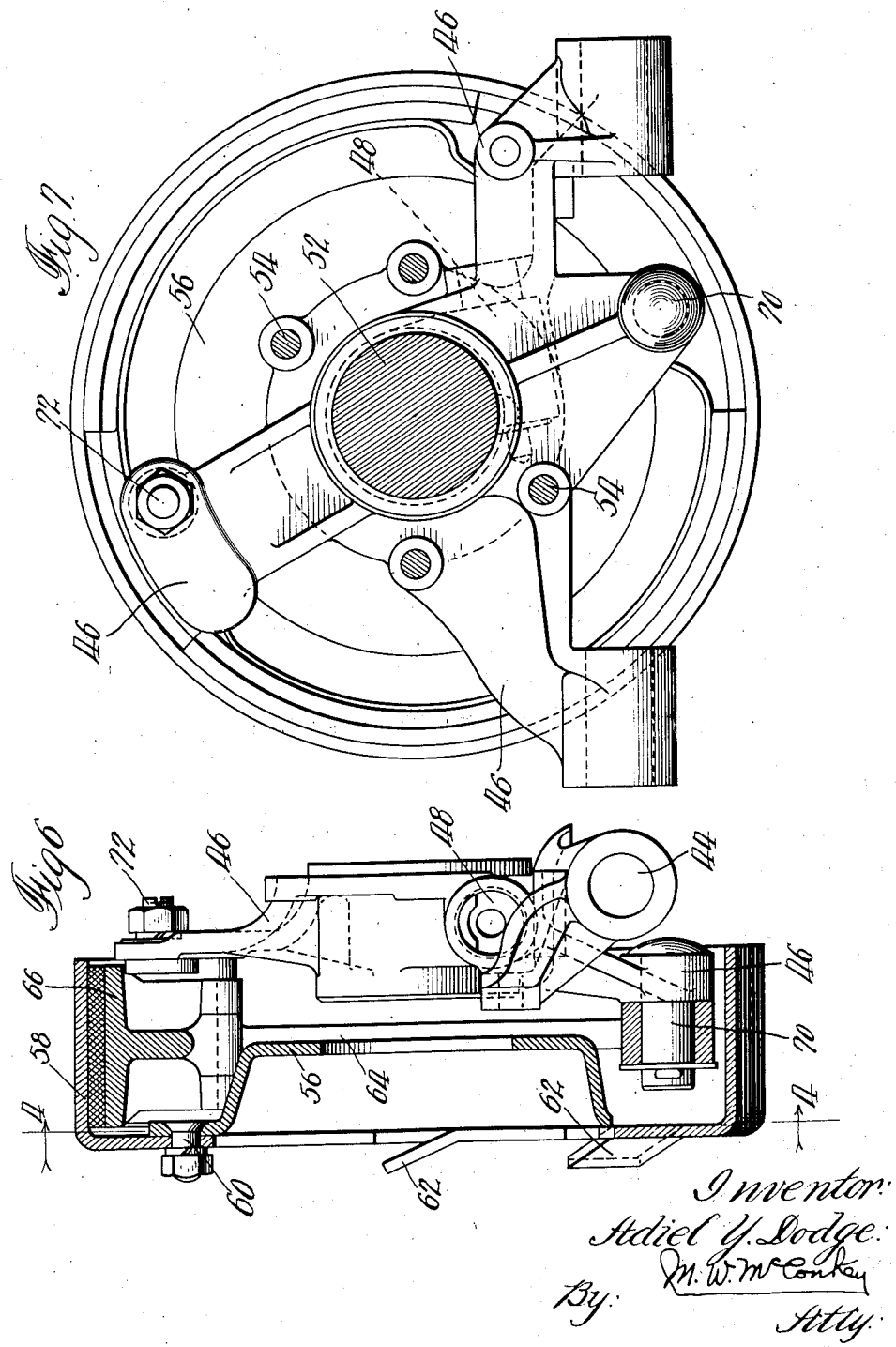

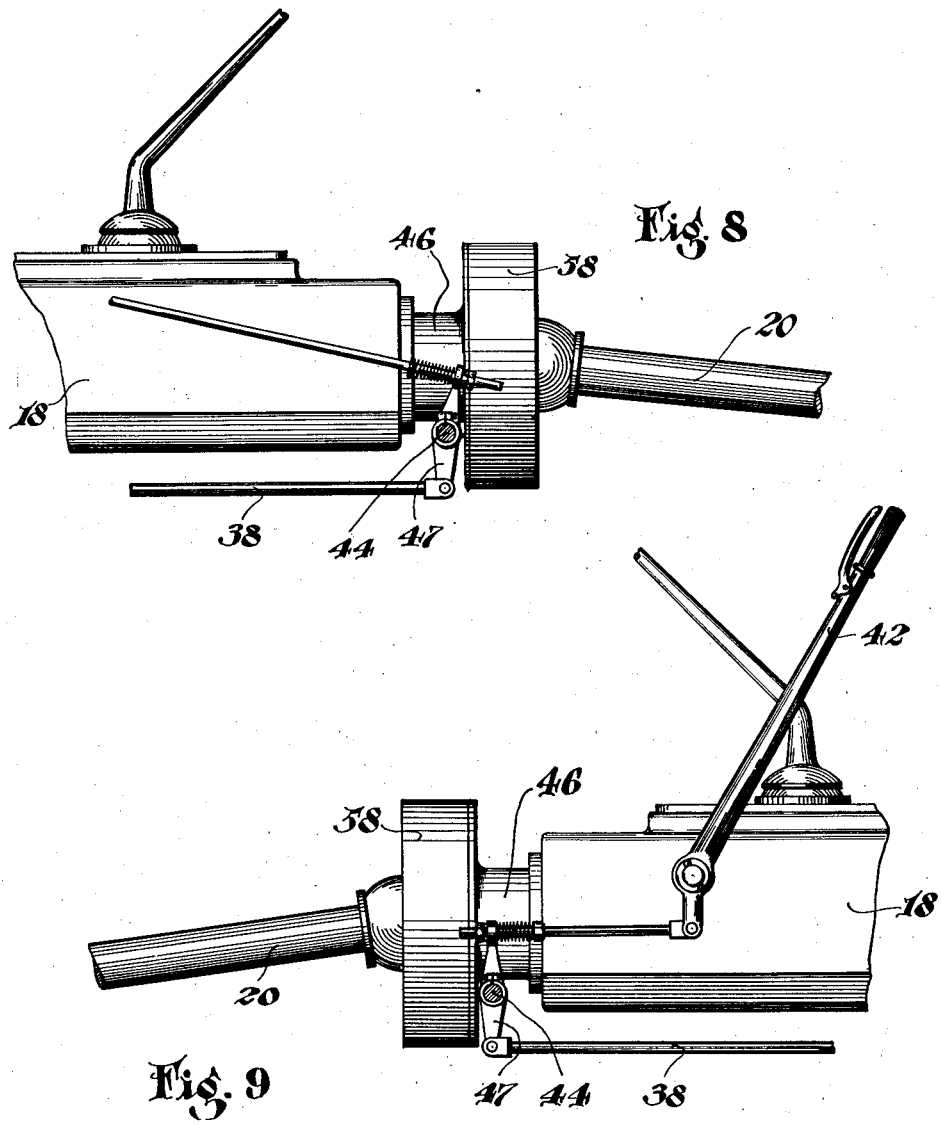

1,820,604

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKING SYSTEM

Application filed June 17, 1925. Serial No. 37,660.

This invention relates to brakes, and is illustrated as embodied in an automobile chassis having brakes on the front wheels and a novel transmission brake acting on the rear wheels. An object of the invention is to secure a system of this character having a very powerful retarding action against forward movement of the vehicle, while at the same time having sufficient power in retarding rearward movement, the retarding means during rearward movement preferably acting most powerfully on the front wheels. In one desirable arrangement, the retarding means includes sets of connected shoes, having a self-energizing action by reason of the action of one shoe of each set in forcing the other against the drum, and arranged to resist forward vehicle movement, while single shoes, preferably in the front brakes, resist rearward vehicle movement.

The illustrated transmission brake in itself embodies substantial novelty, some of the desirable features being capable of use in brakes of other types. In the form shown, connected shoes are expanded by a novel device on a shaft crosswise of the drum, and preferably the drum is readily detachable to afford access to the shoes. If desired, the front brake operating means may be connected to opposite ends of the shaft.

The above and other objects and features of the invention, including various novel combinations of parts and desirable particular constructions, will be apparent from the following description of one illustrative embodiment shown in the accompanying drawings, in which:

Figure 1 is a top plan view of part of an automobile chassis, showing the brake connections;

Figure 2 is a vertical section through one front brake;

Figure 3 is a vertical section through the front brake on the line 3—3 of Figure 2;

Figure 4 is a vertical section, on the line 4—4, Figure 1, through the transmission brake;

Figure 5 is a section through the transmission brake on the line 5—5, Figure 4;

Figure 6 is a section on the same line as Figure 5, but looking in the direction of the arrows 6—6, Figure 4;

Figure 7 is a view of the transmission brake looking from the right in Figure 6, the shaft being in section;

Figure 8 is a side elevation of the transmission brake and associated parts, looking from the left; and Figure 9 is a similar side elevation, looking from the right.

In the arrangement selected for illustration, the chassis comprises a frame 10, supported in the usual manner on rear wheels and a rear axle (not shown), and front wheels swivelled on a front axle 14. The brake drums of the front wheels are shown at 16. The car is driven by an engine (not shown) through the usual transmission 18 and propeller shaft 20 extending to the rear axle.

Each front brake preferably includes a reverse shoe 22, resisting rearward vehicle movement, and a servo shoe 24 connected to a forward shoe 26 to force it against the drum 16 to resist forward vehicle movement. The shoes 22 and 24 are forced against the drum by a double cam 28 operated through a universal joint 30 by a shaft 32 slidably supported at its end by a universal support 34 on the chassis frame 10. The joint 30, being above and in line with the king pin of the wheel, does not interfere with steering, and since its vertical axis is not parallel to the king pin axis, and the front brakes are not equalized, the brake on the outside of a turn will be automatically relieved. Each shaft 32 has an arm 36 operated by a cable or link 38.

All of the brakes are operated either by a pedal 40 or an emergency lever 42, each having an over-running connection with an arm on a shaft 44 journaled in bearings formed in a bracket 46 secured to the end of the transmission housing. Shaft 44 has arms 47 at its ends to which the cables or links 38 are connected. Bracket 46 is preferably formed to replace the usual member at the end of the transmission housing which incloses the speedometer drive, and to this end is formed with a bearing 48 for the drive 50.

At 52 is shown the usual shaft extending through the end of the transmission housing, and having a flange to be secured to a universal joint connecting it in the customary manner to the propeller shaft. As this shaft and its mounting do not in themselves form part of my invention, and as their construction is well known, the shaft is shown only in Figure 7, and is omitted in the other figures to avoid obscuring other parts.

To the flange of shaft 52 is secured by bolts and openings 54, which may also attach the universal joint (not shown) if desired, a part such as a plate 56, extending radially of the shaft, and to which is detachably secured a drum 58 by means of bolts and openings 60. Preferably the drum 58 has deflectors 62 pressed out, forming openings, and serving to circulate cooling currents of air through the brake.

By the arrangement described, drum 58 is readily removed, and pushed back down the propeller shaft, without disturbing the universal joint, to afford access to shoes 64 and 66, pivotally connected at 68, and anchored at 70 on the support 46. The eccentric head of a bolt 72 serves as an adjustable stop, and a guide member 74 extends through a slot 76 near the free end of shoe 66. Two return springs are shown, spring 78 being connected at its ends to support 46 and shoe 64, and spring 80 being connected at its ends to member 74 and shoe 66, its connection to member 74 serving as a convenient connection to support 46.

Shoe 66 is shown with a hardened steel wear plate 82, having a surface extending radially of the drum and engaged by the rounded end of an arm 84 keyed on shaft 44, to wedge shoe 66 against the drum. Thus rocking shaft 44 applies all three brakes.

Certain features not claimed herein are claimed in my copending application Serial No. 552,615, filed July 23, 1931.

While one illustrative embodiment has been described in detail, it is not my intention to limit the scope of the invention to that particular embodiment, or otherwise than by the terms of the appended claims.

I claim:

1. A vehicle having, in combination, transmission mechanism including a shaft and a housing, dirigible wheels having brakes, a brake acting on said transmission shaft and including a drum and friction means within the drum, a rockshaft supported by the transmission housing between said housing and the drum, means operated by the two ends of the rockshaft for applying the brakes on the dirigible wheels, and means operated by an intermediate part of the shaft and extending into said drum for applying the transmission brake.

2. A vehicle having, in combination, transmission mechanism including a shaft and a housing, dirigible wheels having brakes, a brake acting on said transmission shaft and including a drum and friction means within the drum, a rockshaft supported by the transmission housing, arms secured to the two ends of the rockshaft and connections therefrom for applying the brakes on the dirigible wheels, and a third arm on an intermediate part of the shaft and extending into the drum and arranged to apply the transmission brake.

3. A vehicle having, in combination, a transmission including a housing and a shaft passing outside of the housing, a drum secured to the shaft to rotate therewith and facing toward the housing, connected shoes within the drum and between the drum and housing arranged to be forced against the drum in such a manner that one shoe moves a short distance circumferentially of the drum to force the next shoe against the drum, means carried by the housing and projecting into the drum to transmit the braking torque from the shoes to the transmission housing, and means for forcing the first shoe against the drum.

4. A vehicle having, in combination, a transmission including a housing and a shaft passing outside of the housing, a drum secured to the shaft to rotate therewith and facing with its open side toward the housing, retarding means enclosed by the drum and said housing and arranged to be forced against the drum, means to transmit the braking torque to the transmission housing, and means carried by the housing and projecting into the drum for forcing said retarding means against the drum.

5. A vehicle having, in combination, a transmission including a housing and a shaft passing outside of the housing, a drum secured to the shaft to rotate therewith, connected shoes within the drum arranged to be forced against the drum, an anchor carried by the housing and projecting into the drum for one end of the connected shoes arranged to take the braking torque, and means also carried by the housing and projecting into the drum to force the other end of the connected shoes against the drum.

6. A vehicle having, in combination, a transmission including a housing and a shaft, a drum connected to the shaft to rotate therewith, a friction device associated with the drum, a rockshaft extending across the end of the housing and arranged to extend across a chord of the drum between the drum and housing, and means operated by the rockshaft for forcing the friction device against the drum.

7. A vehicle having, in combination, a transmission including a housing and a shaft, a drum connected to the shaft to rotate therewith, a friction device within the drum, a rockshaft extending across the end of the housing between the housing and drum, and an arm on the rockshaft arranged to force the friction device against the drum.

8. A vehicle as defined by claim 7, in combination with additional brake-operating means at the end of the rockshaft.

9. A brake unit for a transmission comprising, in combination, a supporting bracket to be secured to the end of the transmission housing and formed as a cover for a speedometer drive, retarding means anchored on the bracket, and a rockshaft supported by the bracket and arranged to operate the retarding means.

10. A brake unit for a transmission comprising, in combination, a supporting bracket to be secured to the end of the transmission housing and having bearings at its opposite sides, retarding means anchored on the bracket, and a rockshaft supported by the bracket bearings and arranged to operate the retarding means and extending transversely across the retarding means.

11. A brake unit for a transmission comprising, in combination, a supporting bracket to be secured to the end of the transmission housing, connected brake shoes mounted on the bracket and means for transmitting braking torque from the shoes to the bracket, a rockshaft supported by the bracket at its opposite sides and extending transversely across the shoes, and a part operated by the rockshaft and engaging the end of the connected shoes to apply them.

12. A brake comprising, in combination, a readily detachable supporting bracket arranged to be secured to the housing of a transmission, a plate arranged to be secured to the flange of a universal joint at the rear of the transmission, retarding means between the plate and bracket and anchored on the bracket, and a drum secured to the edge of the plate in a manner permitting ready detachment to afford access to the retarding means without disconnecting the plate and flange.

In testimony whereof I have hereunto signed my name.

ADIEL Y. DODGE.